United States Patent [19]

Ishimaru et al.

[11] 3,868,364
[45] Feb. 25, 1975

[54] IMPROVED PROCESS FOR PRODUCING PENICILLIN COMPOUND

[75] Inventors: Toshiyasu Ishimaru, Osaka; Yutaka Kodama, Tokyo, both of Japan

[73] Assignee: Toyama Chemical Co., Ltd., Tokyo, Japan

[22] Filed: Sept. 29, 1971

[21] Appl. No.: 184,921

[30] Foreign Application Priority Data
Oct. 17, 1970   Japan.................................. 45-90971

[52] U.S. Cl. ........................................... 260/239.1
[51] Int. Cl............................................. C07d 99/16
[58] Field of Search.................................. 260/239.1

[56] References Cited
UNITED STATES PATENTS 3,249,622   5/1966   Herrling et al................... 260/239.1
3,678,037   7/1972   Robinson......................... 260/239.1

Primary Examiner—Nicholas S. Rizzo
Attorney, Agent, or Firm—Oblon, Fisher, Spivak, McClelland & Maier

[57]  ABSTRACT

Penicillin is prepared in an industrially advantageous manner by reacting 6-amino-penicillanic acid with silylhalides, to protect the carboxyl group of the 6-aminopenicillanic acid, by forming a mixed acid anhydride grouping, then reacting the above obtained product in the presence of an acid-binding agent with reactive derivatives of carboxylic acid, and then solvolyzing the product to remove the protecting group of the carboxy group to form penicillin.

8 Claims, No Drawings

IMPROVED PROCESS FOR PRODUCING PENICILLIN COMPOUND

BACKGROUND OF THE INVENTION

1. Field of the Invention

This invention relates to an improved process for producing an antibiotic substance, and more particularly to a novel process for producing penicillins.

2. Description of Prior Art

The penicillins to be produced by the process of this invention are shown by the following general formula (I):

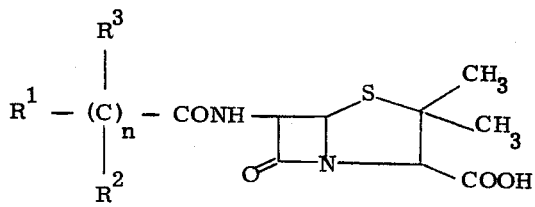

(I)

wherein each of $R^1$ and $R^2$ signifies a hydrogen atom or a substituted or unsubstituted alkyl, aryl, aralkyl, aryloxy, cycloalkane or heterocyclic group, or $R^1$ and $R^2$ may jointly form a ring, and $R^3$ signifies a hydrogen atom, halogen atom, hydroxyl, amino, alkylamino, azido, alkyloxy, alkylthio, benzyloxycarbonyl, benzhydroxycarbonyl or alkoxycarbonyl group, and n signifies the numeral 0 or 1.

These penicillins such as, for example, α-phenoxyethylpenicillin, α-phenoxypropylpenicillins, methylphenylisoxazolylpenicillin, methylchlorophenylisoxazolylpenicillin, methyldichlorophenylisoxazolylpenicillin, α-aminobenzylpenicillin, α-carboxylbenzylpenicillin, 2,6-dimethoxyphenylpenicillin, aminocyclohexylpenicillin, etc., show strong antibacterial properties against gram-positive bacterias and gram-negative bacterias and are extremely superior as a medicine against diseases which affect human beings or other animals.

It has been known that one method for preparing these penicillins is by the Schotten Baumann process which involves dissolving an alkali metal salt of 6-aminopenicillanic acid of the formula (II),

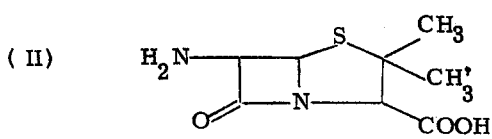

(II)

in water, and then reacting an acid halide therewith. It is also known to produce these penicillins by dissolving a trialkylamine salt of the general formula (II) in an organic solvent, then reacting the reactive derivatives of carboxylic acid in the presence of an acid-binding agent.

However, since the Schotten Baumann process is generally reacted under alkaline conditions, cleavage of the unstable β-lactam ring in the molecule of the compound (II) can occur, so that the purity of the resultant compound (I) is extremely poor and its yield is low. On the other hand, although the reaction, in a non-aqueous solvent, of the trialkylamine salt of the formula (II) is uniform, its yield is low and cleavage of the β-lactam ring occurs. Complicated steps are therefore necessary to separate and refine the resultant product, which renders this technique unadvantageous from an industrial point of view.

It is also known to produce the compounds of formula (I) by dissolving the compound of formula (II) into a non-aqueous solvent, so as to prevent the cleavage of the β-lactam ring of the compound of the formula (II), and then subject it to acylation. This provides a good yield except trialkylamine salt. Several reports have been published concerning this method including: a process for protecting carboxylic group of 6-aminopenicillanic acid with trialkylsilyl group [Ann. 673,166-170 (1964)]; a process for protecting carboxylic group and amino group of 6-aminopenicillanic acid together with trialkylsilyl group [Japanese Patent Publication No. 4064/65, and No. 8353/65, Belg. Pat. No. 615344 (1962), U.S. Pat. No. 3,249,622 (1966)].

According to these processes, the compound of formula (II), protected by the trialkylsilyl group, provides good dissolving properties towards various solvents, and the removal of the protecting group after the acylation is very easy. The yield of product is also excellent.

However, these conventional processes require a reaction with an excess amount of trialkylsilylchloride, N-trimethylsilyldiethylamine, hexamethyldisilazane, etc., in a cooperative solvent, at a temperature of 60° to 90°C., or above, for long periods of time, with the compound of the formula (II), in order to prepare trialkylsilyl derivatives of the compound of the formula (II). The yield of the product is not always very good, and the compound of the formula (II) may be dissolved during heating, so that from an industrial viewpoint these processes are somewhat disadvantageous.

SUMMARY OF THE INVENTION

It is, therefore, an object of this invention to provide an improved process for producing penicillins.

It is another object of this invention to provide a process for the acylation of 6-aminopenicillanic acid to produce penicillins in an industrially advantageous manner.

It is a further object of this invention to provide a process for protecting 6-aminopenicillanic acid with a silyl compound containing at least one C-O-Si bond in a molecule, and for removing the protecting group after its acylation, so as to produce penicillins.

These and further objects have now herein been provided by the discovery that the silyl group containing at least one C-O-Si bond in a molecule is an extremely superior protecting group, as compared with silyl groups containing C-Si bonds only, representing the conventional trialkylsilylchloride.

According to the process of this invention, the penicillins are produced by reacting a tertiary amine salt of 6-aminopenicillanic acid of the formula (II) with a silylhalide of the following general formula (III);

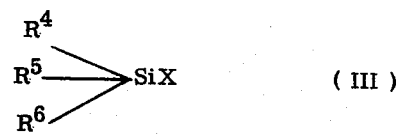

(III)

wherein each of $R^4$ and $R^5$ may be the same or different, and each signifies an alkyl, haloalkyl, aryl, aralkyl, alkyloxy, haloalkyloxy, alkoxyalkyl, aryloxy, aralkyloxy group or halogen atom, $R^6$ signifies alkyloxy, aryloxy, haloalkyloxy, or aralkyloxy group, and X signifies a halogen atom, then reacting the product obtained above in the presence of an acid-binding agent with reactive derivatives of carboxylic acid of the following general formula (IV):

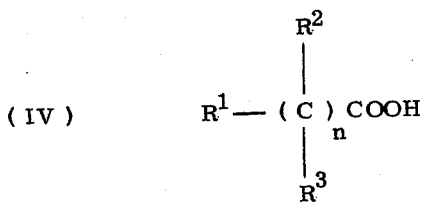

wherein the symbols signify the same as those in the previous formula, and then solvolyzing the product.

DETAILED DESCRIPTION OF PREFERRED EMBODIMENTS

Suitable tertiary amine salts of the formula (II), used in this invention include, for example, trialkylamine salt, N-methylpiperidine salt, N-methylmorpholine salt, etc.

Suitable silylhalides of the general formula (III) include monoethylmonomethoxysilyldichloride, chloromethyl(methoxy)-silyldichloride, dimethoxysilyldichloride, trimethoxysilylchloride, dimethylmonomethoxysilylchloride, monomethylmonoethoxysilyldichloride, diethoxysilyldichloride, triethoxysilylchloride, dibutoxysilyldichloride, tributoxysilylchloride, bis(β-chloroethoxy)silyldichloride, tris(β-chloroethoxy)silylchloride, phenylmethoxysilyldichloride, diphenoxysilyldichloride, dibenzyloxysilyldichloride, etc.

Suitable carboxylic acids of the general formula (IV) include, for example, phenyl acetic acid, α-phenoxyacetic acid, α-phenoxypropionic acid, α-phenoxybutyric acid, diphenoxyacetic acid, diphenylacetic acid, naphthoxyacetic acid, α-aminophenylacetic acid, α-chlorophenylacetic acid, α-bromophenylacetic acid, α-azido-phenylacetic acid, mandelic acid, α-bromophenylacetic acid, α-azido-phenylacetic acid, mandelic acid, α-methylthiophenylacetic acid, α-ethoxycarbonylphenylacetic acid, tetrazolylacetic acid, 1-aminocyclohexanecarboxylic acid, 2,6-dimethoxybenzoic acid, α-benzyloxycarbonylphenylacetic acid, 3-phenyl-5-methyl-4-isoxazolylcarboxylic acid, 3-(2-chlorophenyl)-5-methyl-4-isoxazolylcarboxylic acid, 3-(2,6-dichlorophenyl)-5-methyl-4-isoxazolylcarboxylic acid, 3-(2-chloro-6-fluorophenyl(-5-methyl-4-isoxazolylcarboxylic acid, 3-phenyl-5-methyl-4-isothiazolylcarboxylic acid, N-(methoxycarbonylpropen-2-yl)-α-aminophenylacetic acid, N-(N,N-dimethylaminocarbonylpropen-2-yl)-α-aminophenylacetic acid, etc. These reactive derivatives include the acid halides, acid anhydrides, mixed acid anhydrides with organic or inorganic acids, active esters, acid azides, acid cyanides, active acid amides, etc., particularly preferably acid chlorides, mixed acid anhydrides, or active acid amides. The mixed acid anhydrides include those with substituted acetate, alkyl carbonate, aryl carbonate, or, aralkyl carbonate. The active esters include, for example, cyanomethyl ester, substituted phenyl ester, substituted benzyl ester, substituted thiophenyl ester, etc. The active acid amides include, for example, N-acylsaccharin, N-acylimidazole, N-acylbenzoylamide, N,N-dicyclohexyl-N-acylurea, N-acylsulfonamide, etc. When the compound of the formula (IV) is an α-amino acid, the objective product may be produced in a high yield by reaction as a cyclic anhydride, such as oxazolidine-2,5-dione; mixed acid anhydride, in which the amino group is protected in the form of a Schiff base, such as an aldehyde, ketone, β-diketone, β-keto-acid ester or mono- or disubstituted amide of β-keto-acid; or hydrochloride of acid chloide.

The acid-binding agent of this reaction includes trialkylamine, N,N-dialkyl aniline, pyridine and its homologs, quinoline and its homologs, N-alkylmorpholine, n-alkylpiperidine, etc., and particularly pyridine, picolines, lutidines, N,N-dimethylaniline, and the like are preferred.

In carrying out the present process, the tertiary amine salt of the compound of the formula (II) is dissolved in a proper solvent such as, for example, methylene chloride, chloroform, carbon tetrachloride, ethylene chloride, trichloroethane, trichlene, acetonitrile, acetone, tetrahydrofuran, dioxane, ethyleneglycoldimethyl ether, dimethylformamide, dimethylacetamide, or the like, and this solution is added to a solution containing 0.5 to 1.5 mol., a slightly excessive amount, of acid-binding agent at a temperature below 60°C.

The reaction proceeds extremely rapidly to a gel state or to a solution which is transparent to light yellow. Suitable solvents for the compound of formula (III) include benzene, toluene, xylene, ethyl acetate, etc., in addition to the aforementioned solvents.

While the mixture is being cooled, or after the mixture reaches room temperature, the reactive derivatives of the compound of formula (IV) are added and reacted therewith. A small amount of water or alcohol, such as, for example, methyl alcohol, ethyl alcohol, propyl alcohol, butyl alcohol, etc., is added so that the silyl derivatives are decomposed.

Solvolysis is ordinarily conducted at room temperature or while being slightly cooled, so that an active hydrogen of a carboxylic group or an amino group is regenerated.

It is very interesting that the compound of formula (III) can be used in such extremely small amounts as 0.5 to 1.5 mol., with respect to the compound of formula (II), and still be able to obtain silylation. It is also interesting that the reaction with the reactive derivatives of the compound of formula (IV) has the property for acylation in a high yield and that the silyl group is simply removed by decomposition by the addition of the solvent.

Since the compound of formula (III) is decomposed when a slight amount of water is present in the reaction system, it is used in a slight excess, rather than merely in a corresponding stoichiometric amount. The infrared absorption spectrum of the intermediate is measured by use of a solvent which does not dissolve a hydrohalogenide of the tertiary amine, such as, for example, benzene, toluene, dioxane, etc., to remove the trialkyl amine salt. As a result, the absorption in the region of 1,600 $cm^{-1}$ is vanished, and a new stronger absorption based on the carboxylic acid ester is detected in the region of 1,720 $cm^{-1}$. Accordingly, the reactive position of the compound of formula (III), as compared with formula (II), is assumed to be the carboxylic group. However, it is not indispensable to remove the hydrohalogenide of the tertiary amine in carrying out the present invention. The product thus obtained may be refined in any conventionally known technique and the yield will be found to be excellent as compared with conventional processes by producing the pure product.

As mentioned above in detail, the present invention provides a process for producing penicillins which uses an entirely novel silylation agent not known heretofore, to protect the compound of formula (II) with the silyl group. Silylation is effected with almost any corresponding mole amount, and the reaction is simple and is characterized by high yield. The product is produced in high purity and hence the process is very valuable from an industrial point of view.

The following Examples are given by way of illustration only and are not to be construed as limiting unless otherwise specified.

EXAMPLE 1

1.16 grams of methylmethoxysilyldichloride was dissolved in 20 ml. of methylene chloride, and 2.4 g. of N,N-dimethylaniline was added thereto while being cooled in ice. To this solution was added a mixture of 3.2 g. of triethylamine salt of 6-aminopenicillanic acid, 1.2 g. of N,N-dimethylaniline and 10 ml. of methylene chloride at room temperature. After the addition, the mixture was stirred at a temperature of 30° to 40°C. for 10 to 15 minutes, and then 30 ml. of benzene was added thereto, to become white gel state. Then, to the reaction mixture was added, dropwise, a mixed solution of 3 ml. of methylene chloride and 2.2 g. of $\alpha$-phenoxypropionylchloride, while being cooled in ice. After stirring for about 30 minutes, the mixture was allowed to reach room temperature, and the mixture was further reacted at 30° to 35°C. for 2 hours, to form a light yellow solution. To this mixture was added 2 ml. of n-butyl alcohol, and was then reacted for 30 minutes. The solvent was distilled therefrom under reduced pressure. To the residue was added 30 ml. of ethyl acetate and 30 ml. of ice water, which was adjusted to a pH of 2 with 10 percent hydrochloric acid. After the organic layer was washed with a saturated saline water, magnesium sulfate was added thereto, and dried. The organic layer was filtered, and the concentrated aqueous solution of 1.2 g. of potassium acetate was added thereto while being cooled in ice, to gradually deposit white crystals. The deposited crystals were collected, and washed with acetone. There was obtained 3.93 g. (98 percent) of a potassium salt of phenoxyethylpenicillin.

When this was recrystallized from aqueous acetone, there was obtained 3.85 g. (95 percent) of white crystals showing a decomposition point at 220°C.

The infrared absorption spectrum and thin layer chromatogram of the product was identical with those of the standard sample.

EXAMPLE 2

The procedure of Example 1 was repeated under the same reaction conditions, except that 2.6 g. of trimethoxysilylchloride was used instead of methylmethoxysilyldichloride, and there was obtained 3.85 g. (95 percent) of potassium salt of phenoxyethylpenicillin.

EXAMPLE 3

The procedure of Example 1 was repeated under the same reaction conditions, except that 1.5 g. of ($\beta$-chloroethoxy)methylsilyldichloride was used instead of methylmethoxysilyldichloride, and there was obtained 3.45 g. (86 percent) of crude crystals of potassium salt of phenoxyethylpenicillin. When it was recrystallized from aqueous acetone, there was obtained 3.2 g. of the objective pure product.

EXAMPLE 4

1.99 g. of $\alpha$-phenoxypropionic acid was dissolved in 15 ml. of methylene chloride, and 1.31 g. of triethylamine was added thereto at room temperature. This solution was cooled, and to the solution was added dropwise 1.4 g. of ethyl chlorocarbonate at −15° to −12°C., and then the mixture was reacted at the same temperature for 1 hour, and then cooled to −20°C. On the other hand, 1.16 g. of methylmethoxysilyldichloride was dissolved in 20 ml. of methylene chloride, and to the solution was added 2.4 g. of N,N-dimethylaniline while being cooled in ice. To the mixture was added at room temperature a mixture of 3.2 g. of triethylamine salt of 6-aminopenicillanic acid, and 20 ml. of methylene chloride and 1.2 g. of N,N-dimethylaniline. After the mixture was stirred at 30° to 40°C. for 10 minutes, 30 ml. of ethyl acetate was added thereto, and then cooled to −20°C. Then, the mixed acid anhydride previously prepared was added once thereto, and the mixture was reacted at −10° to 0°C. for 30 minutes and then at 0° to 25°C. for 2 hours. After the reaction was completed, to the mixture was added 2 ml. of n-butanol, and the mixture was reacted at room temperature for 30 minutes. Then to the mixture was added ice water, and the mixture was adjusted to a pH of 2 with 10 percent hydrochloric acid, and the organic layer was sufficiently washed with saturated saline water, and dried with magnesium sulfate. The organic layer was collected and the solvent was distilled under reduced pressure. To the residue was added 10 ml. of butyl acetate and 3 ml. of acetone to be dissolved, and then fine powder of 1.2 g. of potassium acetate was added thereto, and was stirred. There were deposited white crystals after once dissolved. The crystals deposited were collected, and washed with acetone, and there were obtained 4.02 g. (100 percent) of crude crystals of potassium salt of phenoxyethylpenicillin. When recrystallized from aqueous acetone, there was obtained 3.7 g. (93 percent) of objective product showing a decomposition point at 220°C.

EXAMPLE 5

1.16 g. of methylmethoxysilyldichloride was dissolved in 20 ml. of methylene chloride, and to the solution was added 2.4 g. of N,N-dimethylaniline while being cooled in ice. To the mixture was added, at room temperature, a mixture of 3.2 g. of triethylamine salt of 6-aminopenicillanic acid, 1.2 g. of N,N-dimethylaniline and 10 ml. of methylene chloride, and then added 30 ml. of ethyl acetate, to become white gel state. Then, to the mixture was added, dropwise, 2.4 g. of phenoxybutyrylchloride in 3 ml. of methylene chloride while being cooled in ice. After being stirred for about 30 minutes, the mixture was reacted at room temperature for 1 hour, at 30° to 35°C. for 2 hours, and then 2 ml. of n-butanol was added, thereto, at room temperature, and stirred for 30 minutes. The same amount of ice water was added to the reaction solution, and the mixture was adjusted to a pH of 2 with 10 percent hydrochloric acid while being cooled in ice, and the organic layer was sufficiently washed with water. After the organic layer was dried with magnesium sulfate, the solvent was distilled under reduced pressure. To the residue was added 10 ml. of butyl acetate and 3 ml. of acetone to be dissolved, and then 1.2 g. of fine powder of potassium acetate was added thereto. There were deposited, gradually, white crystals after once dissolved. When the crystals deposited were collected and washed sufficiently with acetone, there was obtained 3.6 g. (87 percent) of phenoxypropylpenicillin. When recrystallized from aqueous acetone, there were obtained white crystals showing a decomposition point at 215°C. The infrared absorption spectrum of the product was identical with those of the standard sample.

EXAMPLE 6

1.9 g. of dimethoxysilyldichloride was dissolved in 20 ml. of methylene chloride, and to the solution was added 2.4 g. of N,N-dimethylaniline while being cooled in ice. To the mixture was added a mixture of 3.2 g. of triethylamine salt of 6-aminopenicillanic acid, 1.2 g. of N,N-dimethylaniline and 10 ml. of methylene chloride at room temperature, and then 30 ml. of benzene was added thereto, to form a white gel state. Then, to the mixture was added, dropwise, a solution of 5 ml. of methylene chloride, and 2.66 g. of 3-phenyl-5-methyl-4-isoxazolylcarbonylchloride, while being cooled in ice. After reacting for about 30 minutes, the mixture was allowed to reach room temperature, and was reacted at 30° to 35°C. for 3 hours. To the mixture was added 2 ml. of n-butanol at room temperature, and then stirred for 30 minutes. The same amount of water was added to the reaction mixture, and then the pH of the mixture was adjusted to 2 with 10 percent hydrochloric acid while being cooled in ice, and the organic layer was sufficiently washed with water. The solvent was distilled under reduced pressure, and to the residue was added 10 ml. of butyl acetate, 3 ml. of acetone and 3 droplets of water to be dissolved, and fine powder of sodium acetate was added thereto, and then after once dissolved, there were deposited crystals. The deposited crystals were collected, and washed sufficiently with acetone, and there were obtained 3.75 g. (85 percent) of white crude crystals of sodium salt of methyl phenylisoxazolylpenicillin. When recrystallized from aqueous acetone, there were obtained white crystals showing a decomposition point of 188°C. to 190°C. The infrared absorption spectrum of the product was identical with those of the standard sample.

EXAMPLE 7

1.2 g. of methylmethoxysilyldichloride was dissolved in 20 ml. of methylene chloride, and to the solution was added 2.4 g. of N,N-dimethylaniline while being cooled in ice. To the mixture was added a mixture of 3.2 g. of triethylamine salt of 6-aminopenicillanic acid, 1.2 g. of N,N-dimethylaniline and 10 ml. of methylene chloride at room temperature to form a white gel state. Then, to the mixture was slowly added, dropwise, 3.5 g. of 3-(2,6-dichlorophenyl)-5-methyl-4-isoxazolylcarbonylchloride in 5 ml. of methylene chloride. After reacting for about 30 minutes, the mixture was allowed to reach room temperature, and then reacted at 30° to 35°C. for 3 hours. To the mixture was added, at room temperature, 2 ml. of n-butanol, and then stirred for 30 minutes. To the reaction mixture was added water, and the pH of the mixture was adjusted to 2 with 10 percent hydrochloric acid. After the methylene chloride layer was sufficiently washed with water, the solvent was distilled under reduced pressure. To the residue was added 10 ml. of butyl acetate, 3 ml. of acetone and 3 droplets of water, and then 1 g. of fine powder of sodium acetate was added. After once dissolved, there were white crystals deposited. The crystals deposited were collected, and washed sufficiently with acetone, and then there was obtained 4.2 g. (83 percent) of white crude crystals of sodium salt of methyldichlorophenylisoxazolylpenicillin. When recrystallized from aqueous acetone, there was obtained 3.8 g. of the objective product of white crystals showing a decomposition point of 220°–222°C.

EXAMPLE 8

1.34 g. of methylmethoxysilyldichloride was dissolved in 25 ml. of methylene chloride, and to the solution was added 2 g. of N,N-dimethylaniline while being cooled in ice. To the mixture was added a mixture of 3.68 g. of triethylamine salt of 6-aminopenicillanic acid, 1.3 g. of N,N-dimethylaniline and 12 ml. of methylene chloride, and then the mixture was stirred at 30° to 40°C. for 10 minutes, and 30 ml. of ethyl acetate was added thereto to become a gel state. The mixture was cooled to be maintained at −5°C. On the other hand, 3.8 g. of potassium N-(methoxycarbonylpropen-2-yl)-α-aminophenylacetate was suspended in 27 ml. of ethyl acetate, and 2 droplets of N-methylmorpholine was added thereto while being cooled in ice, and then 1.52 g. of ethyl chlorocarbonate in 3 ml. of ethyl acetate was added dropwise. When being stirred for 60 minutes, a mixed acid anhydride was produced.

The anhydride thus obtained was added once to the solution previously prepared while being cooled in ice, and reacted at the same temperature for 2 hours. The insoluble matter was collected by filtration, and the filtrate was concentrated under reduced pressure. To the residue was added 4.5 ml. of water and 30 ml. of methylisobutylketone to be dissolved, and then the mixture was adjusted to a pH of 2 with dilute hydrochloric acid, and then maintained for 15 minutes. A water layer was collected, and the pH thereof was adjusted to 5 to 5.2 with triethylamine, while being cooled. The crystals deposited were collected, and washed sufficiently with cold water. There were obtained 2.9 g. (62 percent) of white crystals of D-(−)α-aminobenzylpenicillin trihydrate.

The infrared absorption spectrum of the product was identical with those of the standard sample. The titer of the biological quantitative analysis of the product was 773 mcg. titers/mg.

EXAMPLE 9

1.34 g. of methylmethoxysilyldichloride was dissolved to 25 ml. of methylene chloride, and to the solution was added dropwise 2 g. of N,N-dimethylaniline while being cooled in ice. To the mixture was added a mixture of 3.68 g. of triethylamine salt of 6-aminopenicillanic acid, 1.3 g. of N,N-dimethylaniline, and 12 ml. of methylene chloride at room temperature, and after the mixture was stirred at 30° to 40°C. for 10 minutes, 30 ml. of ethyl acetate was added thereto, to form a white gel state. This was maintained at −45° to −40°C.

On the other hand, 3.62 g. of sodium N-(N,N-dimethylaminocarbonylpropen-2-yl)-α-aminophenylacetate was suspended to 30 ml. of methylene chloride, and the mixture was cooled to −40°C. Then, to the mixture was added 2 droplets of N-methylmorpholine, and 1.52 g. of ethyl chlorocarbonate in 5 ml. of methylene chloride was added dropwise thereto. Further, the mixture was stirred at the same temperature for 90 minutes, and there was thus obtained a mixed acid anhydride. The anhydride obtained was added once to the solution previously prepared, and the mixture was reacted at −40°C. for 1 hour, at −30°C. for 30 minutes, and then to 0°C. for 30 minutes. The reaction mixture was filtered, and the filtrate was concentrated at a low temperature under reduced pressure, and then the methylene chloride was distilled. To the residue were added 4.5 ml. of water and 30 ml. of methylisobutylketone to be dissolved. The mixture was adjusted at a pH of 2 with dilute hydrochloric acid, and maintained for 15 minutes. A water layer was collected and was adjusted at a pH of 5 to 5.2 with triethylamine, while being cooled. The crystals deposited were collected, and washed sufficiently with cold water, and there were obtained white crystals of D-(−)-α-aminobenzylpenicillin trihydrate. When these were recrystallized in an ordinary procedure, there were obtained 3.2 g. (68.5 percent) of white crystals. The titer of the biological quantitative analysis of the product showed 770 mcg. titers/mg.

EXAMPLE 10

A mixture of 3.17 g. of triethylamine salt of 6-aminopenicillanic acid, 2.4 g. of N,N-dimethylaniline and 20 ml. of methylene chloride was cooled to 0°C., and to the mixed solution was added dropwise a solution of 1.4 g. of methylmethoxysilyldichloride, 2.4 g. of N,N-dimethylaniline and 10 ml. of methylene chloride during 15 minutes. Further, the mixture was reacted for 30 minutes, and then to the mixture was added, little by little, 2.2 g. of D-(−)-α-aminophenylacetylchloride hydrochloride, and then the mixture was reacted at 0°C. for 14 hours. To the reaction mixture was added 14 ml. of water, and after the mixture was stirred for 10 minutes, a water layer was collected, and then adjusted at a pH of 5.0 with triethylamine, while being cooled. The crystals deposited were collected and washed with 50 percent aqueous acetone and then acetone, and there were obtained 3.2 g. (79.4 percent) of white crystals of D-(−)-α-aminobenzylpenicillin trihydrate.

The titer of biological quantitative analysis of the product was 875 µg titers/mg.

EXAMPLE 11

The procedure of Example 10 was repeated under the same conditions, except that 3.1 g. of dibenzyloxysilyldichloride was used instead of methylmethoxysilyldichloride, and there were obtained 2.6 g. (64.5 percent) of white crystals of D(−)-α-aminobenzylpenicillin trihydrate.

EXAMPLE 12

To a solution of 3.17 g. of triethylamine salt of 6-aminopenicillanic acid, 2.4 g. of N,N-dimethylaniline and 20 ml. of methylene chloride was slowly added dropwise to a mixture of 2.1 g. of phenylmethoxysilyldichloride, 2.4 g. of N,N-dimethylaniline and 10 ml. of methylene chloride at 0°C. After being stirred at the same temperature for 30 minutes, to the mixture was slowly added dropwise a methylene chloride solution of 3.1 g. of 3-(2,6-dichlorophenyl)-5-methyl-4-isoxazolylcarbonylchloride, and the mixture was reacted at 0°C. for 8 hours. After 2 ml. of water was added to the reaction mixture, which was then stirred for 30 minutes, the mixture was poured into 20 ml. of ice water, and the pH thereof was adjusted to 2.0 with dilute hydrochloric acid, and an organic layer was collected and washed sufficiently with water, and then the solvent was distilled under reduced pressure. Thereafter, when treated in a method of Example 7, there were obtained 3.85 g. (75 percent) of white crystals of sodium salt of methyldichlorophenylisoxazolylpenicillin, showing a decomposition point of 222° to 223°C.

EXAMPLE 13

The procedure of Example 10 was repeated under the same reaction conditions, except that 2.8 g. of diphenoxysilyldichloride was used in place of methylmethoxysilyldichloride, and there were obtained 2.82 g. (70 percent) of white crystals of D(−)-α-aminobenzylpenicillin trihydrate. The titer of biological quantitative analysis of the product showed 840 µG titers/mg.

EXAMPLE 14

The procedure of Example 10 was repeated under the same reaction conditions, except that 1.8 g. of chloromethyl(methoxy)silyldichloride was used instead of methylmethoxysilyldichloride, and there were obtained 2.65 g. (65.5 percent) of white crystals of D(−)-α-aminobenzylpenicillin trihydrate. The titer of the biological quantitative analysis product showed 874 g titers/mg.

Having now fully described the invention, it will be apparent to one of ordinary skill in the art, that many changes and modifications can be made thereto, without departing from the spirit or scope of the invention.

What is claimed as new and intended to be secured by Letters Patent of the United States is:

1. In a process for producing a penicillin of the formula:

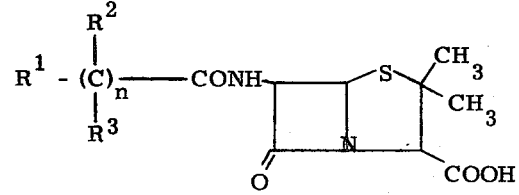

wherein $R^1$ and $R^2$ signify a hydrogen atom or a lower alkyl, phenyl, phenoxy, 3-phenyl-5-methyl-4-isoxazolyl, or 3-(halo-substituted phenyl)-5-methyl-4-isoxazolyl group; $R^3$ signifies a hydrogen atom, or an amino group and n signifies the numeral 0 or 1, the improvement which comprises:

reacting at a temperature below 60°C a triloweralkylamine, N-methyl-piperidine or N-methylmorpholine salt of 6-aminopenicillanic acid with a silylhalide having the formula:

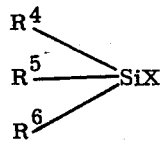

wherein R[4] signifies loweralkyl, loweralkoxy, benzyloxy, phenyl, phenoxy or haloloweralkyl; R[5] signifies loweralkoxy or halogen; R[6] signifies lower-alkoxy, phenoxy, benzyloxy or β-haloethoxy and X signifies halogen to protect the carbonyl group of the 6-aminopenicillanic acid by forming a mixed acid anhydride grouping; reacting the above obtained product in the presence of an acid-binding agent selected from the group consisting of triloweralkylamine, N,N-diloweralkylaniline, pyridine, quinoline, N-loweralkylmorpholine, N-loweralkylpiperdine, picoline and lutidine, with a reactive derivative of a carboxylic acid having the formula:

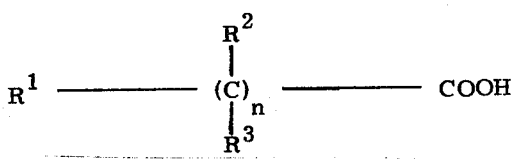

wherein R[1], R[2], R[3] and n are the same as indicated above, and then solvolyzing the product with water or loweraliphatic alcohol to remove the protecting group of the carboxyl group.

2. The process according to claim 1, wherein the tertiary amine salt of 6-aminopenicillanic acid is triloweralkylamine salt.

3. The process according to claim 1, wherein the silylhalide is selected from the group consisting of methylmethoxysilyldichloride, trimethoxysilylchloride, (β-chloroethoxy)methylsilyldichloride, dimethoxysilyldichloride, dibenzyloxysilyldichloride, phenylmethoxysilyldichloride, diphenoxysilyldichloride and chloromethyl(methoxy)silyldichloride.

4. The process according to claim 1, wherein the carboxylic acid is selected from the group consisting of α-phenoxypropionic acid, α-phenoxybutyric acid, 3-phenyl-5-methyl-4-isoxazolyl-carboxylic acid, 3-(2,6-dichlorophenyl)-5-methyl-4-isoxazolylcarboxylic acid, N-(methoxycarbonylpropen-2-yl)-α-aminophenylacetic acid, N-(N,N-dimethylaminocarbonylpropen-2-yl)-α-aminophenylacetic acid and α-aminophenylacetic acid.

5. The process according to claim 1, wherein the reaction between the tertiary amine salt of 6-aminopenicillanic acid and the silylhalide is carried out in the presence of an acid-binding agent selected from the group consisting of triloweralkylamine, N,N-diloweralkylaniline, pyridine, quinoline, N-loweralkylmorpholine, N-loweralkylpiperidine, picoline and lutidine at a temperature below 60°C.

6. The process according to claim 5, wherein the acid-binding agent is dimethylaniline.

7. The process according to claim 1, wherein the lower aliphatic alcohol is butyl alcohol.

8. The process according to claim 5, wherein the molar ratio of the silyhalide to the 6-aminopenicillanic acid is from 0.5 to 1.5.

* * * * *